C. W. SALADEE

Whiffletree.

No. 51,089. Patented Nov. 21, 1865.

UNITED STATES PATENT OFFICE.

CYRUS W. SALADEE, OF NEWARK, OHIO.

IMPROVED SNAP-HOOK FOR WHIFFLETREES.

Specification forming part of Letters Patent No. 51,089, dated November 21, 1865.

*To all whom it may concern:*

Be it known that I, CYRUS W. SALADEE, of Newark, county of Licking, State of Ohio, have invented a new and Improved Mode of Constructing Snap-Hooks for Whiffletrees; and I do hereby declare the following to be a full and exact description of the same, reference being had to the accompanying drawings, and to the letters of reference marked thereon.

The nature of my invention consists, first, in the peculiar arrangement of the hook by which the trace is retained in place on the end of the whiffletree; second, the peculiar arrangement of the spring by which said hook is operated; and, third, the arrangement of the plate covering and protecting said spring from mud, sand, &c.

Figure 1:
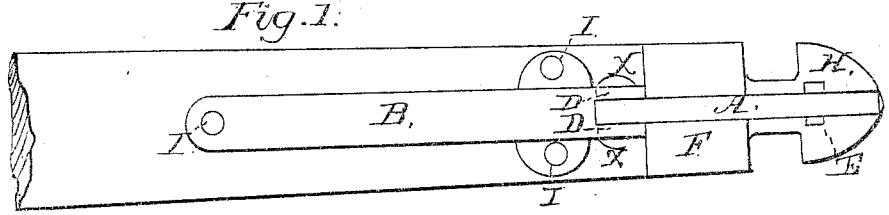
Figure 2:
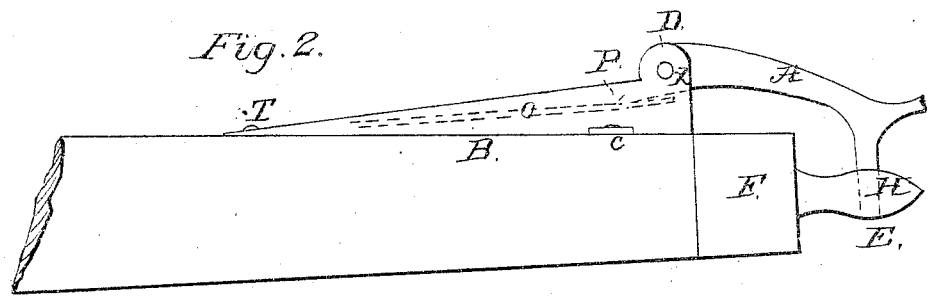
Figure 3:
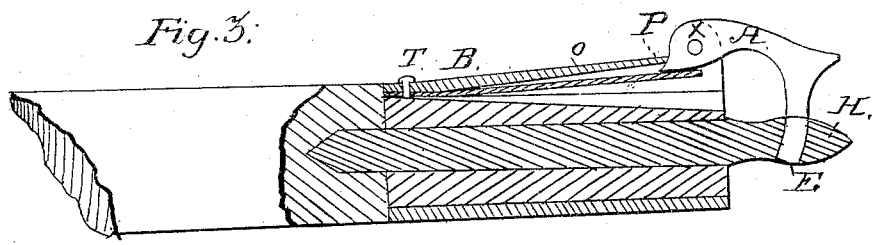
Figure 4:
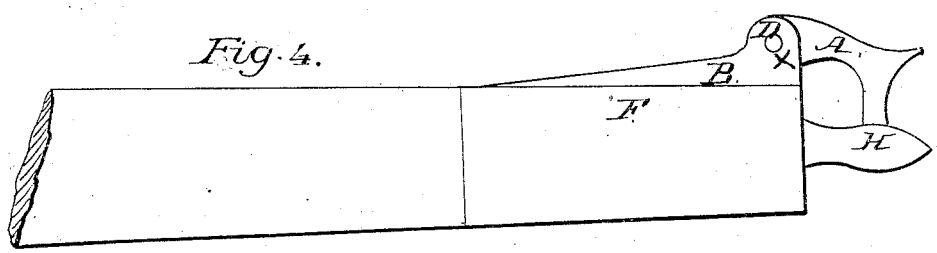

In the drawings, Figure 1 represents a top view of the end of the whiffletree with the snap-hook attached. Fig. 2 is a side view of the same. Fig. 3 is a side view in section, representing the snap-hook made a part of the ferrule F. Fig. 4 is a full side view of the long ferrule F, with plate B attached as part of the same.

Figs. 1 and 2 represent the manner of attaching the snap-hook to whiffletrees independent of the ferrule F by means of three screws, I I I, while in Figs. 3 and 4 the plate B of the snap-hook A is cast solid with the ferrule F. There is a peculiar advantage in each of these two several ways of securing the snap-hook to the ends of the whiffletree. For all new work the combined snap-hook and ferrule F, as shown by Figs. 3 and 4, would be preferable; but in case we desire to attach the snap-hooks to whiffletrees now in use, the manner of doing the same, as shown by Figs. 1 and 2, would be adopted in place of and in preference to that shown by Figs. 3 and 4. In attaching the snap-hook as shown in Figs. 1 and 2, I need not interfere with the ferrule F, but simply screw the plate B to the top of the whiffletree by means of the three screws I I I, and which can be done in five minutes' time; but where the whiffletree is made new out and out it will be found as easy to attach the ferrule F with the snap-hook attached thereto, as shown in Figs. 3 and 4, as without it. Thus in either case the snap-hook is secured to the end of the whiffletree by one simple operation.

The plate B, holding the bar end of the snap-hook A, is formed about three-eighths of an inch wide and about two and one-half inches long, and hollowed out on the under side, so as to form a mere shell or covering to protect the spring O from mud, sand, &c. To the sides of the plate B is cast solid the projecting flanges C C, through which pass the screws I I, Fig. 1. Through the rear end of the plate B, Fig. 1, passes the third screw I, holding the plate to the wood of the whiffletree. The front of plate B is provided with ears D D, between which is held the snap-hook A by means of the small rivet X.

The rear end of the snap-hook A terminates in forming the lever P, (see Fig. 3 and dotted lines in Fig. 2,) upon which acts the spring O. The rear end of the spring O is secured to the inside of the hollow plate B by means of the rivet T, Figs. 2 and 3.

In Fig. 1 is represented a top view of the trace-hook H, now in general use, and showing the square slot E, intended for the passing through of the narrow thong of leather generally used to prevent the trace from slipping from the hook. Into this slot E the front point of my snap-hook A is made to rest, and thereby most effectually prevents the trace from slipping off the trace-hook H.

The arrangement of the plate B, spring O, and snap-hook A, as shown by Figs. 1 and 2 and by Figs. 3 and 4, is exactly alike, except in Figs. 1 and 2 it is independent of the ferrule F, while in Figs. 3 and 4 the plate B is cast solid with the ferrule F and made a part of the same, so that in the first case the attachment of the plate B to the whiffletree is effected by means of the three screws I I I and independent of the ferrule F, while in the latter the connection is made by means of the ferrule, it being virtually a part of the plate B.

I intend manufacturing these snap-hooks of various styles and finishing them according to taste.

What I claim as new of my invention, and desire to secure by Letters Patent, is—

1. The snap-hook A, when constructed and operating in the manner and for the purpose substantially as shown and described.

2. The spring O, in combination with the hollow plate B and the snap-hook A, in the manner and for the purpose substantially as shown and described.

3. The plate B as a covering for the spring O in such manner as to protect the latter from mud and dust, substantially as shown and described.

4. The plate B, or it equivalent, when arranged in combination with the ferrule F, Figs. 3 and 4, in the manner and for the purpose substantially as shown and described.

CYRUS W. SALADEE.

Witnesses:
T. A. SIMES,
E. T. STOVER.